(12) United States Patent
Machida

(10) Patent No.: US 8,005,502 B2
(45) Date of Patent: Aug. 23, 2011

(54) COMMUNICATION APPARATUS

(75) Inventor: Satoshi Machida, Tokyo (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 294 days.

(21) Appl. No.: 12/407,134

(22) Filed: Mar. 19, 2009

(65) Prior Publication Data

US 2009/0305678 A1    Dec. 10, 2009

(30) Foreign Application Priority Data

Jun. 6, 2008 (JP) .................. P2008-149065

(51) Int. Cl.
*H04M 1/00* (2006.01)

(52) U.S. Cl. ................. 455/550.1; 455/418; 455/422.1; 709/206; 379/88.13

(58) Field of Classification Search .............. 455/550.1, 455/418, 422, 1; 709/206; 379/88.13
See application file for complete search history.

(56) References Cited

U.S. PATENT DOCUMENTS

| | | | |
|---|---|---|---|
| 7,058,684 B1* | 6/2006 | Ueda | 709/206 |
| 2002/0048048 A1* | 4/2002 | Kagawa | 358/402 |
| 2002/0060667 A1* | 5/2002 | Ichikawa | 345/172 |
| 2002/0154746 A1* | 10/2002 | Usami | 379/88.13 |
| 2002/0161613 A1* | 10/2002 | Hida | 705/7 |
| 2003/0131001 A1* | 7/2003 | Matsuo | 707/9 |
| 2006/0195533 A1* | 8/2006 | Isozaki et al. | 709/206 |
| 2006/0271631 A1* | 11/2006 | Qureshi et al. | 709/206 |
| 2007/0264966 A1* | 11/2007 | Arai | 455/403 |

FOREIGN PATENT DOCUMENTS

JP    2006-113867 A    4/2006

\* cited by examiner

*Primary Examiner* — Danh Le

(74) *Attorney, Agent, or Firm* — Maschoff Gilmore & Israelsen

(57) ABSTRACT

A communication apparatus having a filter function of rejecting mail reception from an address that differs from a permitted address specified beforehand, includes: a transmission unit configured to transmit a mail to a predetermined mail address that differs from the permitted address; a first storage unit configured to store a mail address of a destination; a judging unit configured such that, when there is an incoming mail from a mail address that differs from the permitted address, the judging unit judges whether or not the mail address of the transmitter of this incoming mail matches a mail address thus stored; and a receiving unit configured such that, in a case in which the judging unit has judged that the mail address of the incoming mail matches that thus stored, the receiving unit receives this incoming mail.

6 Claims, 10 Drawing Sheets

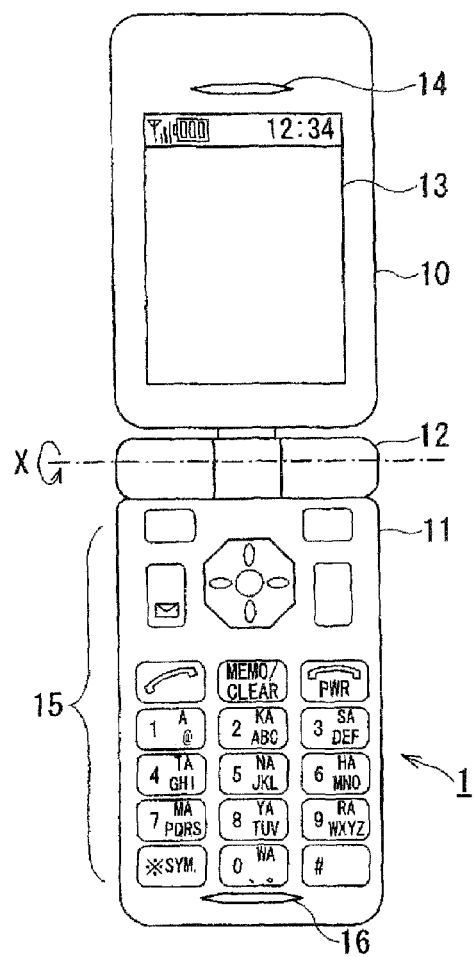
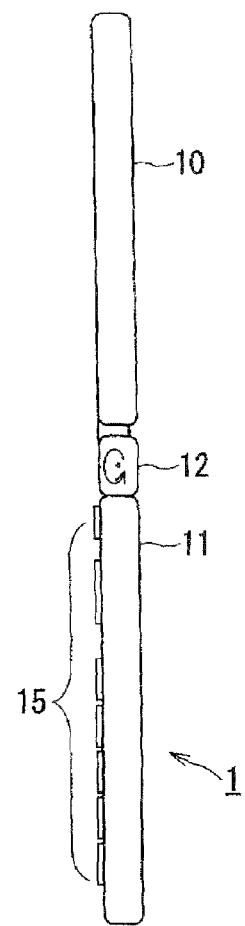
FIG. 1A  FIG. 1B
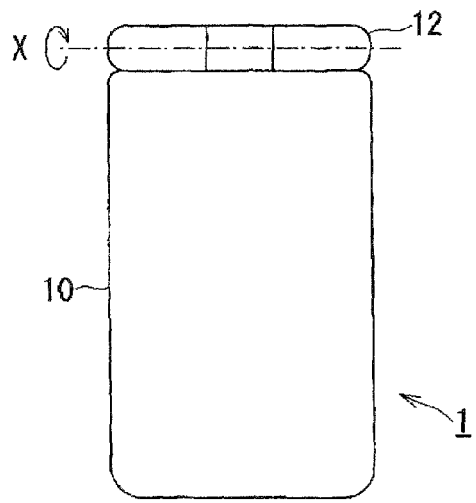
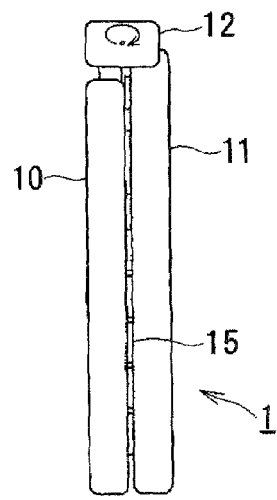
FIG. 2A  FIG. 2B

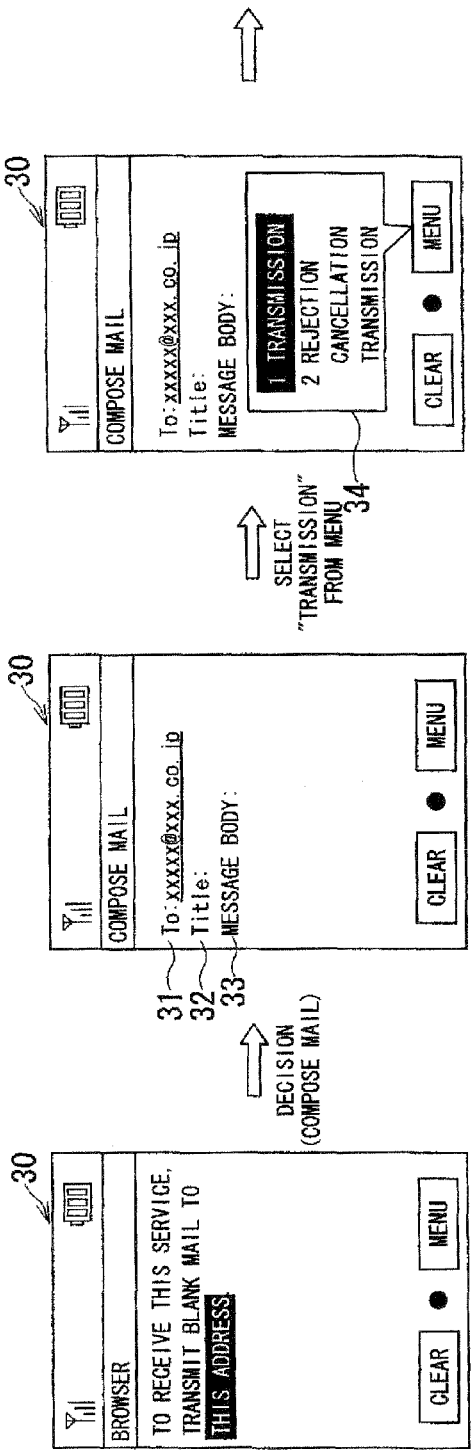
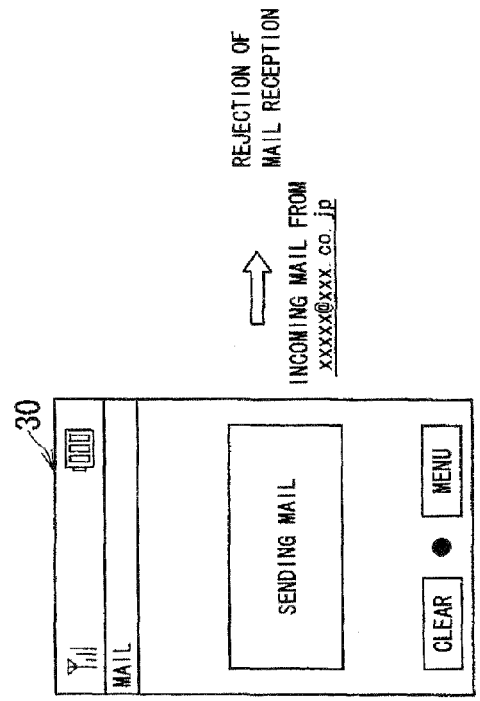

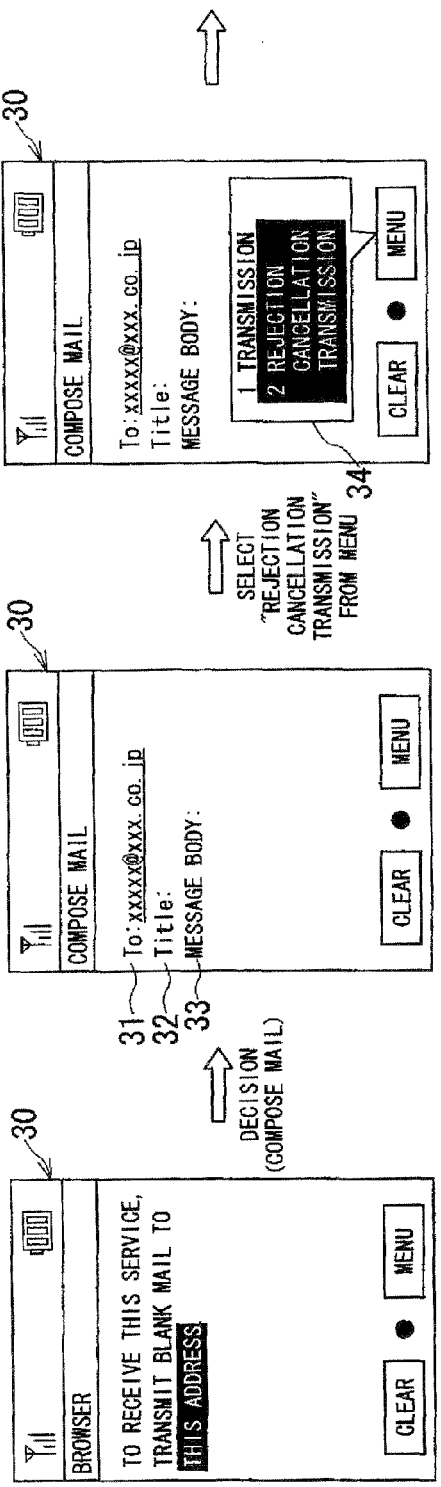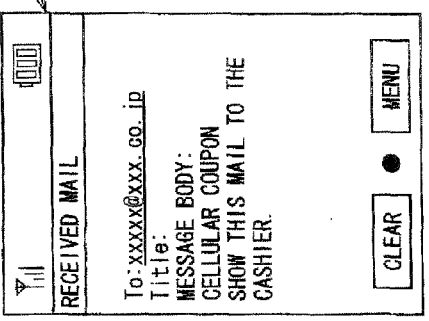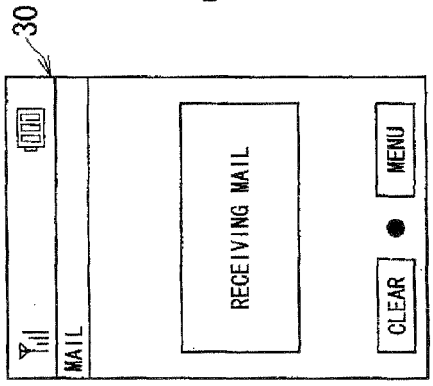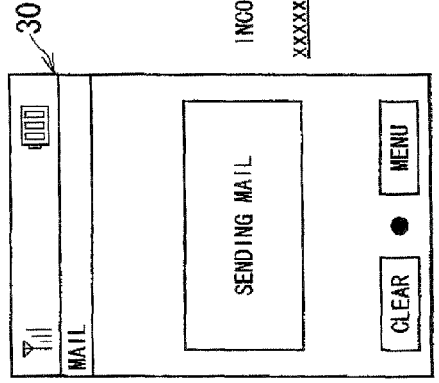

COMMUNICATION APPARATUS

BACKGROUND OF THE INVENTION

1. Field of the Invention

The present invention relates to a communication apparatus having an incoming mail rejection function, and is configured such that, in a case in which the user has transmitted a mail to a particular address for which a reception-permission has not been set, the communication apparatus permits the reception of the mail from this particular address.

2. Description of the Related Art

As communication apparatus such as cellular phones and so forth have come into widespread use, more and more services are coming to use the cellular phone. As one of such services, cellular phone providers provide a service called the cellular-phone blank mail system/cellular coupon. This service allows the user to receive a reply mail including a benefit from a predetermined address by transmitting a blank mail to the predetermined address via the cellular phone. Using this benefit, the user can receive a service such as a discount service or the like.

On the other hand, in order to prevent junk mail which is increasing today, in general, the user sets the configuration of the cellular phone or a network server using the incoming mail rejection function of the cellular phone so as to reject the reception of mail from particular mail addresses other than the mail addresses for which a reception-permission has been set.

However, such an arrangement leads to a problem as follows. That is to say, in a case in which the user has transmitted a blank mail to a particular address for which a reception-permission has not been set when the user desires to use a service of cellular-phone blank mail system/cellular coupon using the cellular phone, in some cases, such an incoming mail rejection function blocks this reply mail.

In order to solve such a problem, an e-mail transmission/reception system which is capable of delivering a replay mail in a sure manner for a blank mail from a cellular phone even if the configuration of the cellular phone has been set so as to reject e-mail from the Internet (see Japanese Unexamined Patent Application Publication No. 2006-113867). In the e-mail transmission/reception system, a first apparatus receives an e-mail via the Internet from the user apparatus which is a cellular phone. Then, the e-mail thus received is forwarded to a predetermined PHS e-mail address, following which a second apparatus acquires the transmission mail address of the user apparatus from the e-mail thus forwarded from the first apparatus, and an e-mail is transmitted to the transmission mail address from the PHS. In this case, the second apparatus transmits an e-mail which shows a Web page URL for use of only the transmission mail address.

Such a method in which a mail transmitted to the cellular phone is temporarily transmitted to another apparatus, following which the cellular phone receives the mail from this apparatus, has a problem as follows. That is to say, when the cellular phone receives a mail from a mail address for which an incoming mail rejection has not been set, such a mail reception operation involves such an additional apparatus in addition to the cellular phone, leading to complicated operations. It is preferable that, after the user transmits a mail via the cellular phone to a mail address for which a reception-permission has not been set, the user can receive a reply mail using the cellular phone alone.

The present invention has been made in order to solve the aforementioned problem. Accordingly, it is an object of the present invention to provide a communication apparatus having an incoming mail rejection function, and is configured such that, in a case in which the user has transmitted a mail to a particular address for which a reception-permission has not been set, the communication apparatus permits the reception of the mail from this particular address without a need for the user to disable the incoming mail rejection function.

SUMMARY OF THE INVENTION

In order to solve the aforementioned problem, a communication apparatus according to the present invention relates to a communication apparatus having a filter function of rejecting mail reception from an address that differs from a permitted address specified beforehand. The communication apparatus comprises: a first transmission unit configured to transmit a mail to a predetermined mail address that differs from the permitted address; a first storage unit configured to store the mail address of a destination to which a mail is transmitted by the first transmission unit; a judging unit configured such that, when there is an incoming mail from a mail address that differs from the permitted address, the judging unit judges whether or not the mail address of the transmitter of this incoming mail matches a mail address stored in the first storage unit; and a receiving unit configured such that, in a case in which the judging unit has judged that the mail address of the incoming mail matches that stored in the first storage unit, the receiving unit receives this incoming mail.

With the communication apparatus having such an incoming mail rejection function according to the present invention, when a reply mail is to be received from a particular address for which a mail reception permission has not been set after a mail has been transmitted to this particular address, such an arrangement permits reception of a reply mail from this particular address without a need to disable the incoming mail rejection function.

BRIEF DESCRIPTION OF THE DRAWINGS

FIG. 1A is a front view which shows a communication apparatus (cellular phone) in the opened state according to the present invention;

FIG. 1B is a side view which shows the communication apparatus (cellular phone) in the opened state according to the present invention;

FIG. 2A is a front view which shows the communication apparatus (cellular phone) in the closed state according to the present invention;

FIG. 2B is a side view which shows the communication apparatus (cellular phone) in the closed state according to the present invention;

FIGS. 5A through 5E are screen transmission diagrams which show filter control processing when an incoming mail rejection function is not to be disabled in a cellular phone according to a first embodiment;

FIGS. 6A through 6F are screen transmission diagrams which show filter control processing when the incoming mail rejection function is to be disabled in the cellular phone according to a first embodiment;

DESCRIPTION OF THE PREFERRED EMBODIMENTS

First Embodiment

Figure 3:
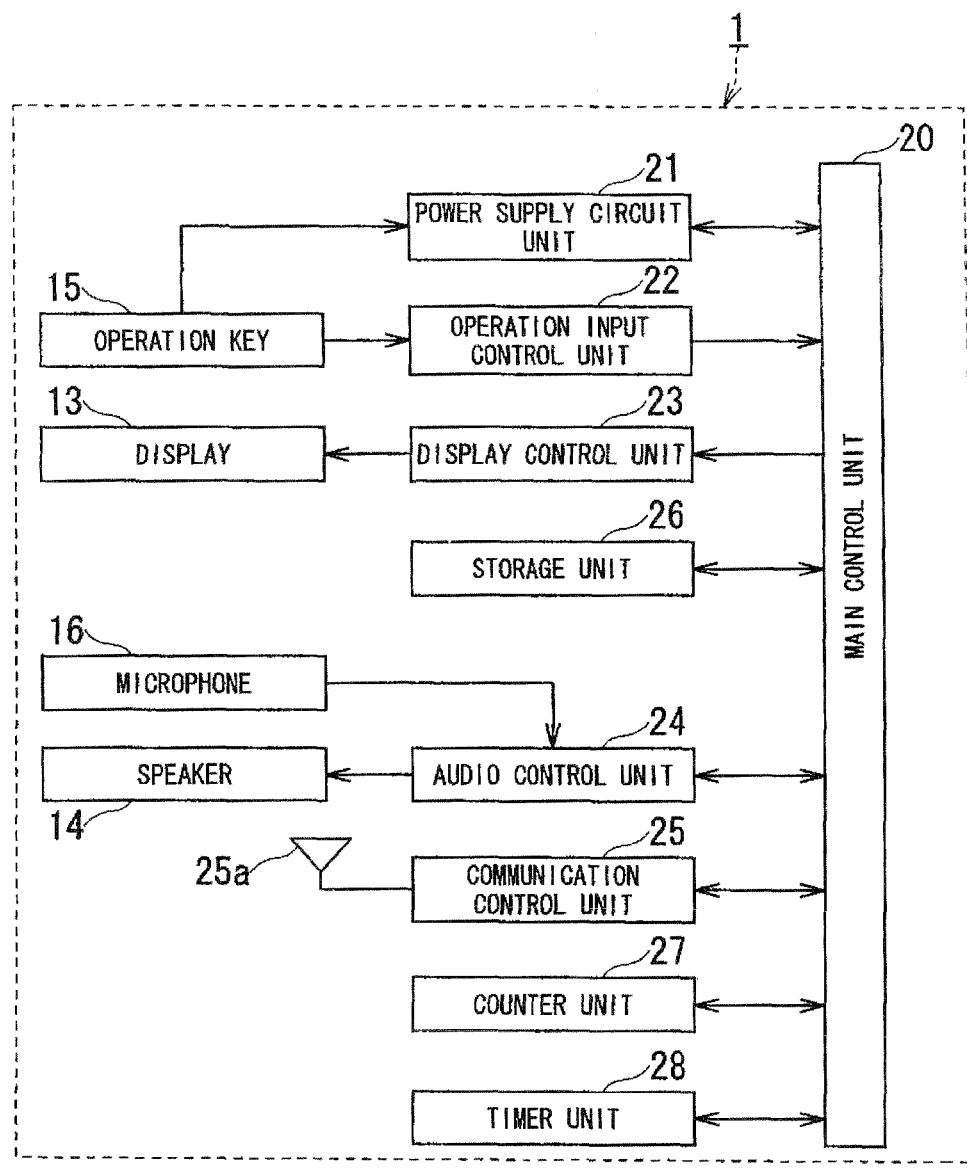
FIG. 3 is a function block diagram which shows the communication apparatus (cellular phone) according to the present invention.

Description will be made regarding a first embodiment of a communication apparatus according to the present invention with reference to FIGS. 1 through 7.

Description will be made regarding a clamshell cellular phone 1 configured of multiple casings hinged to one another so as to allow the user to open and close the cellular phone 1, as an example of the mobile communication apparatus according to the first embodiment. FIG. 1A is a front view which shows the cellular phone 1 in the opened state. FIG. 1B is a side view which shows the cellular phone 1 in the opened state. FIG. 2A is a back view which shows the cellular phone 1 in the closed state. FIG. 2B is a side view which shows the cellular phone 1 in the closed state.

As shown in FIGS. 1 and 2, the cellular phone 1 has a configuration principally including an upper casing 10 formed in shape of a rectangular plate and an lower casing 11 having approximately the same shape such that they lie on top of each other in the closed state. These upper casing 10 and the lower casing 11 are hinged with a hinge portion 12 positioned therebetween. The cellular phone 1 is configured so as to allow the user to turn the upper casing 10 relatively as to the lower casing 11 with the hinge portion 12 as an turning axis by a predetermined angle in the X direction shown in FIGS. 1 and 2. Such an arrangement allows the user to switch the state of the cellular phone 1 from the closed state to the opened state, and to switch the state thereof from the opened state to the closed state, by turning the upper casing 10 relatively to the lower casing 11.

The inside face of the upper casing 10 (the face that faces the lower casing 11) includes a display 13 for displaying a text, image, and so forth, and a speaker 14 for outputting an acoustic sound received from the party who is in communication. When the cellular phone 1 is in the closed state, the display 13 and the speaker 14 are covered with the lower casing 11, and are not exposed to view from the outside. On the other hand, when the cellular phone 1 is switched to the opened state by turning the upper casing 10 relative to the lower casing 11, the display 13 and the speaker 14 are exposed to view from the outside.

The inside face of the lower casing 11 (the face that faces the upper casing 10) includes operation keys 15 comprising a power key which allows the user to switch the ON/OFF state of the power supply, a call key which allows the user to perform call processing, numeric keys which allows the user to input numbers and text, a shortcut key which allows the user to start up a mail function, Web function, or the like, and so forth. Furthermore, the lower casing 11 includes a microphone 16 for collecting sound. When the cellular phone 1 is in the closed state, the operation keys 15 and the microphone 16 are covered with the upper casing 10, and are not exposed to view from the outside. On the other hand, when the cellular phone 1 is switched to the opened state by turning the upper casing 10 relative to the lower casing 11, these components are exposed to view from the outside.

Next, description will be made regarding the functions of the cellular phone 1 with reference to the function block diagram shown in FIG. 3. As shown in FIG. 3, the cellular phone 1 comprises a main control unit 20, a power supply circuit unit 21, an operation input control unit 22, a display control unit 23, an audio control unit 24, a communication control unit 25, a storage unit 23, a counter unit 27, and a timer unit 28, connected to one another via a bus.

The main control unit 20 includes a CPU (Central Processing Unit). The main control unit 20 performs an overall control operation for the cellular phone 1, filter control processing described later, and various kinds of other computation processing and control processing, etc. The power supply circuit unit 21 includes a power supply source (battery or the like), and switches the power supply between the ON state and the OFF state based upon the input operation performed via the power supply key. When the power supply is in the ON state, electric power is supplied to each component from the power supply source, thereby switching the cellular phone 1 to the operable state.

The operation input control unit 22 includes an input interface for the operation keys 15. When the operation input control unit 22 detects that any one of the operation keys 15 has been pressed, the operation input control unit 22 generates a signal that corresponds to this operation key 15 thus pressed, and transmits the signal thus generated to the main control unit 20. The display control unit 23 includes a display interface for the display 13. The display control unit 23 displays document data, image data, etc., on the display 13 under the control of the main control unit 20. Furthermore, the display control unit 23 disables or enables the display function for the display 13 under the control of the main control unit 20.

Under the control of the main control unit 20, the audio control unit 24 generates an analog audio signal from the acoustic sound collected by the microphone 16, and converts the analog audio signal into a digital audio signal. Furthermore, when the audio control unit 24 acquires a digital audio signal, the audio control unit 24 converts the digital audio signal into an analog audio signal, and outputs the analog audio signal via the speaker 14 in the form of sound, under the control of the main control unit 20.

Under the control of the main control unit 20, the communication control unit 25 reconstructs the data by performing spread spectrum inverse processing on a signal received from a base station via an antenna 25*a*. The data is transmitted to the audio control unit 24 and is output via the speaker 14, or is transmitted to the display control unit 23 and is displayed on the display 13, or is stored in a storage unit 26, according to an instruction from the main control unit 20. Furthermore, under the control of the main control unit 20, when the communication control unit 25 acquires the audio data collected by the microphone 16, the data input via the operation keys 15, or the data stored in the storage unit 26, the communication control unit 25 performs the spread spectrum processing on the data, and transmits the data thus subjected to the spread spectrum processing to the base station via the antenna 25*a*.

The storage unit 26 has a configuration including ROM (Read Only Memory), a hard disk, or nonvolatile memory, which stores a processing program for processing to be performed by the main control unit 20, data which is necessary for the processing, etc., and RAM (Random Access Memory)

which temporarily stores the database and data to be used in the processing performed by the main control unit 20, etc. Let us say that the processing program used by the main control unit 20 to perform filter control processing described later is stored in the ROM, for example.

Upon reception of an instruction from the main control unit 20 to count the mail reception from a particular party until the number of times of mail reception from this particular party reaches a predetermined number, the counter 27 counts the mail reception from this particular party until the number of times of mail reception from this particular party reaches the predetermined number. Then, upon reception of a mail from this particular party, the counter unit 27 transmits a signal to the main control unit 20 to the effect that a mail has been received from this particular party. For example, in a case in which the counter unit 27 has received an instruction to count a mail from this particular party only once, the counter 27 starts a counting operation (starts up a counter). In this case, upon reception of a mail from this particular communication party, the counter unit 27 counts "1", and transmits a signal to the main control unit 20 to the effect that a mail has been received from this particular communication party. In this case, the number of times of mail reception has reached a predetermined number (1), and accordingly, the counting operation (counter) ends.

When the timer unit 28 receives, from the main control unit 20, a signal which is an instruction to start a timer, the timer unit 28 counts time. After the elapse of a predetermined period of time, the timer unit 28 generates a signal which indicates that timer has ended, and transmits the signal thus generated to the main control unit 20. Furthermore, when the timer unit 28 receives, from the main control unit 20, a signal which is an instruction to reset and restart the timer, the timer unit 28 resets the timer to 0, and restarts the time counting operation again.

The cellular phone providers provide various kinds of services for the user using the cellular phone. As one of such services, cellular phone providers provide a service called cellular-phone blank mail system/cellular coupon. This service allows the user to receive a reply mail including a benefit from a predetermined address by transmitting a blank mail to the predetermined address via the cellular phone.

On the other hand, the cellular phone 1 includes an incoming mail rejection function (filtering function). This function allows the user to receive only mail from the transmitters for which a permission has been set while rejecting incoming mail from transmitters (mail addresses) for which a permission has not been set. The storage unit 26 stores beforehand an address book in which multiple phone numbers and mail addresses are registered. For example, such an arrangement regards the mail addresses registered in the address book as the mail addresses for which a permission has been set.

Also, information which indicates whether reception is to be permitted or is to be rejected may be added to each of the phone numbers and the mail addresses registered in the address book. When the user desires to permit the communicate with a particular phone number or a mail address, i.e., in a case in which the information that indicates that reception is to be permitted has been added, an incoming call from this particular phone number or a mail from this particular mail address is received. Furthermore, an incoming call from a phone number without such a reception permission and an incoming mail from a mail address without such a reception permission are rejected. On the other hand, when the user desires to reject the communication with a particular phone number or a mail address, i.e., in a case in which the information that indicates that reception is to be rejected has been added, an incoming call from a phone number without such information and an incoming mail from a mail address without such information are received. Furthermore, an incoming call from a phone number to which such information has been added and a mail from a mail address to which such information has been added are rejected.

Also, when the user desires to reject the communication with all the mail addresses (in a case in which a configuration has been set for rejecting all the mail addresses), there is no mail address having a permission, i.e., all the mail addresses are regarded as the mail addresses having no permission. That is to say, in a case in which the information that indicates whether or not reception is to be permitted has been added, the mail address and the phone number having a permission represent the mail address and the phone number to which this information have been added. On the other hand, in a case in which the information that indicates whether or not reception is to be rejected has been added, the mail address and the phone number having a permission represent the mail address and the phone number to which this information have not been added.

The mail address for which a mail reception permission has been set will be referred to as "permitted address" hereafter. Also, the phone number for which an incoming call permission has been set will be referred to as "permitted phone number" hereafter. In order for the cellular phone 1 to prevent junk mail which is increasing today, in general, the user sets the configuration of the user's own cellular phone or a network server (mail server) so as to reject the reception of mail from the mail addresses that differ from predetermined communication parties.

Accordingly, such an arrangement leads to a problem as follows. That is to say, in a case in which the user has transmitted a blank mail to a particular address when the user desires to use a service of cellular-phone blank mail system/cellular coupon using the cellular phone, in some cases, the incoming mail rejection function rejects a replay mail from this particular address, leading to a problem that the user cannot receive this reply mail.

In order to solve such a problem, the cellular phone 1 has a filtering control function in which, even in a case in which the incoming mail rejection function is in the enabled state, the mail address of a destination to which the user has transmitted a mail is stored, and the cellular phone 1 permits reception of a mail from this mail address. In this case, the cellular phone 1 applies a limit to the reception of the mail from this particular address. That is to say, the cellular phone 1 permits the reception of the mail from this particular address during only a predetermined period of time. Also, the cellular phone 1 permits the reception of the mail from this particular address until the number of times of the mail reception reaches a predetermined number. Such a function ensures the incoming mail rejection function of the cellular phone 1.

As described above, the cellular phone 1 performs the filter control processing in which, after the cellular phone 1 transmits a blank mail to a particular address for which a mail reception permission has not been set, the cellular phone 1 permits the reception of the mail from this particular address only when a predetermined condition is satisfied. Description will be made regarding a procedure used by the cellular phone 1 to perform the filter control processing with reference to flowcharts shown in FIGS. 4 and 7, and transition diagrams shown in FIGS. 5 and 6. Let us consider a case in which the incoming mail rejection function is in the enabled state. Description will be made below omitting the term "Step", as the term "Step S101" will simply be referred to as "S101", for example.

Figure 4:
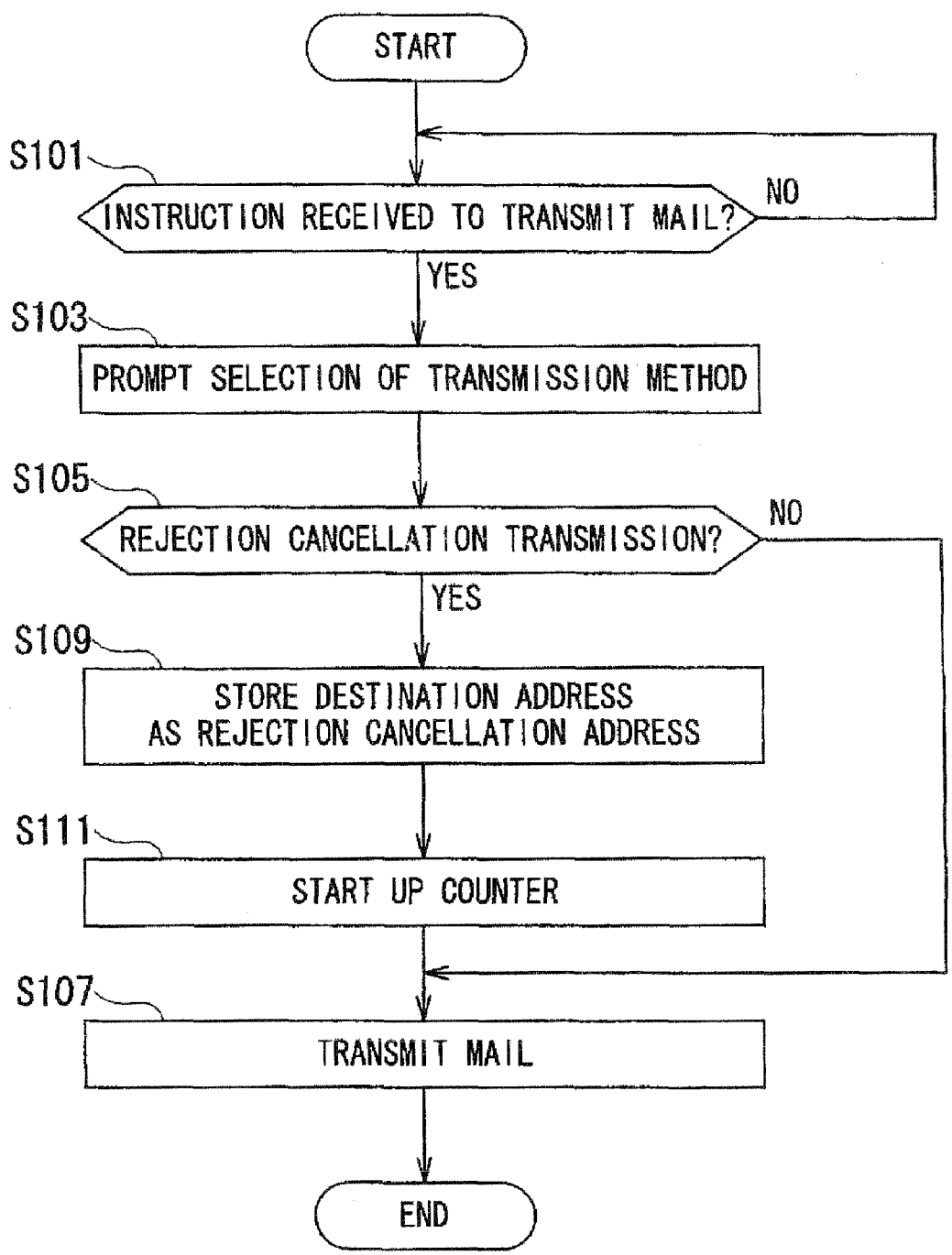
FIG. 4 is a flowchart which shows a procedure for transmitting a mail in filter control processing performed by the cellular phone according to a first embodiment.

First, description will be made with reference to the flowchart shown in FIG. 4 regarding a procedure for the processing for transmitting a mail to a particular address for which a mail reception permission has not been set. In general, when the user is browsing on a Web page via the cellular phone 1, the user often transmits a blank mail to a particular address according to a suggestion of a Web page which the user is browsing. That is to say, as shown in FIGS. 5A and 6A, for example, a message is displayed on a display screen 30 in order to suggest the user to transmit a blank mail. In this case, when the user gives an instruction to transmit a blank mail via the operation keys 15, for example, the cellular phone 1 displays a mail creation screen on the display screen 30, as shown in FIGS. 5B and 6B.

The mail creation screen includes a destination input field 31, a title input field 32, and a message body input field 33. The user inputs the destination for a mail, the title, and so forth, via the operation keys 15 according to the suggestion of the mail creation screen, and instructs the cellular phone 1 via the operation keys 15 to transmit the mail.

In this stage, the main control unit 20 judges whether or not the user gives an instruction to transmit a mail (S101). In this case, for example, in a case in which a predetermined operation key 15 has been pressed after the creation of the mail, the main control unit 20 judges that the user has given an instruction to transmit a mail. In a case in which the user has not given an instruction to transmit a mail (in a case of "No" in S101), the main control unit 20 enters the waiting state without any particular processing.

In a case in which the user has given an instruction to transmit a mail (in a case of "Yes" in S101), the main control unit 20 prompts the user to select a mail transmission method (S103). In this case, the main control unit 20 prompts the user to select the mail transmission method by displaying a transmission method selection field 34 on the display screen 30 as shown in FIGS. 5C and 6C, for example. Examples of the mail transmission methods include a "transmission" mode which indicates a normal transmission method, and a "rejection cancellation transmission" mode in which a mail is transmitted and the incoming rejection function is disabled for the mail address of the mail destination. The user specifies the transmission method for a mail by selecting the transmission method for the mail via the transmission method selection field 34, for example.

The main control unit 20 judges whether or not the "rejection cancellation transmission" mode has been selected as the transmission method (S105). In this step, for example, in a case in which the "rejection cancellation transmission" has been selected via the transmission method selection field 34, the main control unit 20 judges that the user has given an instruction to perform the rejection cancellation transmission. On the other hand, in a case in which the "transmission" has been selected via the transmission method selection field 34, for example, the main control unit 20 judges that the user has not given an instruction to perform the rejection cancellation transmission.

In a case in which the user has not given an instruction to instruct to perform the rejection cancellation transmission (in a case of "No" in S105), the main control unit 20 transmits a mail based upon the information input via the mail creation screen as in the normal state (S107). In this step, it is preferable that a message is displayed on the display screen 30 to the effect that a mail is being transmitted, as shown in FIG. 5D.

In a case in which the user has given an instruction to perform the rejection cancellation transmission (in a case of "Yes" in S105), the main control unit 20 stores the destination mail address in the storage unit 26 as the address of which the rejection is to be cancelled (S109). Furthermore, the main control unit 20 starts up a counter in order to count the number of times of mail reception from the destination mail address (S111). In this step, the main control unit 20 specifies a predetermined number (e.g., 1), and transmits an instruction to count the mail reception until the number of times of mail reception reaches this predetermined number, thereby starting up the counter.

Then, the main control unit 20 transmits a mail based upon the information input via the mail creation screen, for example (S107). In this step, it is preferable that a message is displayed on the display screen 30 to the effect that a mail is being transmitted, as shown in FIG. 6D.

As described above, when the cellular phone 1 transmits a mail to a particular mail address for which a mail reception permission has riot been set, the cellular phone 1 temporarily stores this destination mail address in the storage unit 26 according to an instruction from the user, and starts up a counter for counting the number of times of mail reception from this mail address, following which the cellular phone 1 transmits the mail.

Figure 7:
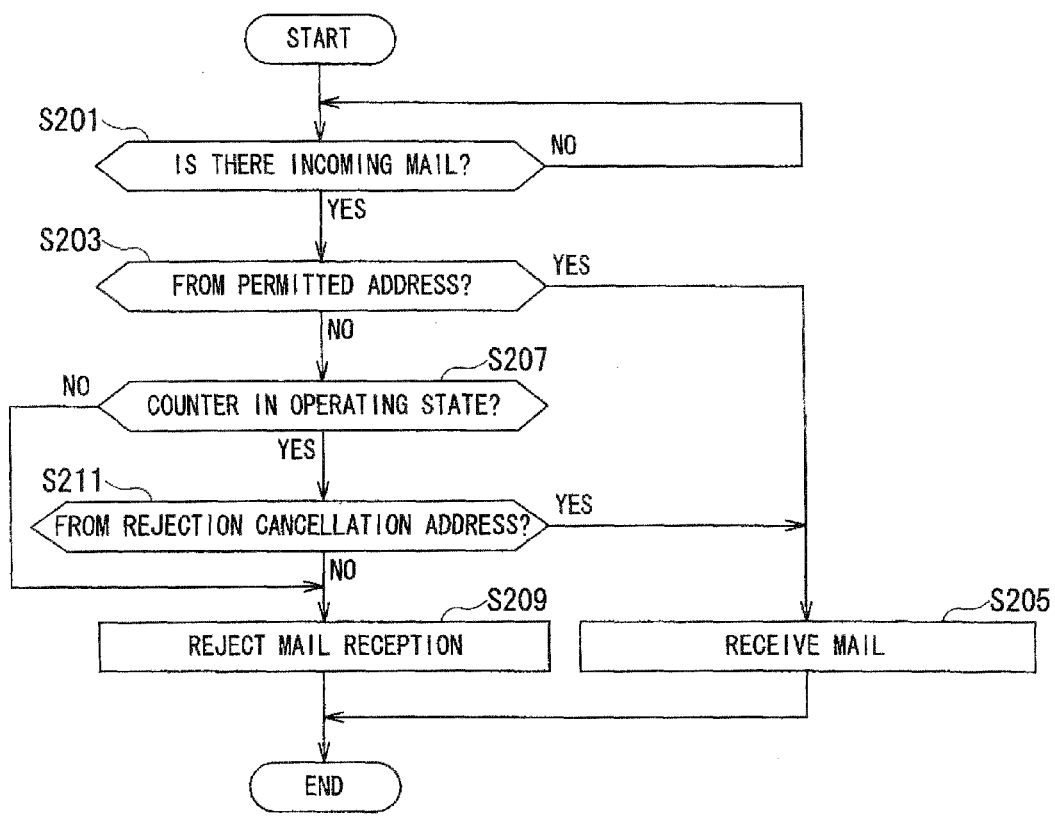
FIG. 7 is a flowchart which shows a procedure for receiving a mail in the filter control processing at the communication apparatus according to the first embodiment.

Next, description will be made with reference to the flowchart shown in FIG. 7 regarding a procedure for processing in which the cellular phone 1 receives a mail from a particular mail address for which mail reception is not permitted in the normal state after the cellular phone 1 has transmitted a mail to this particular address in Steps S101 through S111.

First, the main control unit 20 judges whether or not there is an incoming mail to the cellular phone 1 (S201). When there is an incoming call to the cellular phone 1, the provider of the cellular phone transmits the header of this mail etc., to the cellular phone 1 in order to notify the cellular phone 1 that there is an incoming call to the cellular phone 1. The cellular phone 1, which has received the header etc., from the provider, judges based upon this header information whether this mail is to be received or rejected. When the cellular phone 1 is to receive the incoming mail, the cellular phone 1 requests the provider of the cellular phone to transmit the whole of the mail. Accordingly, in a case in which the cellular phone 1 has received the header of an incoming mail from the provider, for example, the cellular phone 1 judges that there is an incoming mail.

In a case in which there is no incoming mail (in a case of "No" in S201), the main control unit 20 enters the waiting state without any particular processing. In a case in which there is an incoming mail (in a case of "Yes" in S201), the main control unit 20 judges whether or not the transmitter of this mail matches a mail address (permitted mail address) for which a permission has been set (S203). In this step, only in a case in which the mail address of the transmitter matches a mail address set as a permitted address in the address book stored in the storage unit 26, the main control unit 20 judges that the transmitter of this mail matches a permitted mail address.

In a case in which the transmitter of the mall matches a permitted mail address (in a case of "Yes" in S203), the main control unit 20 requests the provider to transmit the incoming mail detected in Step S201, and receives this mail (S205). In this step, it is preferable that a message is displayed on the display screen 30 to the effect that a mail is being received, as shown in FIG. 6E. After the reception of the mail, the main control unit 20 displays the transmitter of the received mail, the title of the mail, and the message body of the mail, on the display screen 30 as shown in FIG. 6F.

In a case in which the mail transmitter matches a mail address for which a permission has not been set (in a case of "No" in S203), the main controller 20 judges whether or not the counter is in the operating state (S207). In this step, in a case in which the counter has been started up in Step S111, the main control unit 20 judges that the counter is in the operating state. It should be noted that, in a case in which the counter operation ends after a predetermined number of times of mail reception after the counter has been started up in Step S111, the main control unit 20 judges that the counter is not in the operating state.

In a case in which the counter is not in the operating state (in a case of "No" in S207), the mail transmitter does not match a permitted mail address, and accordingly, the main controller 20 rejects reception of the incoming mail detected in Step S201 (S209). That is to say, for example, the main control 20 unit does not request the provider to transmit this mail, and removes the header received from the provider in Step S201, thereby rejecting the mail reception. In this case, as shown in FIG. 5E, the information with respect to this mail is not displayed on the display screen 30.

In a case in which the counter is in the operating state (in a case of "Yes" in S207), the main control unit 20 judges whether or not the mail transmitter matches an address of which the rejection is to be cancelled (S211). That is to say, the main control unit 20 judges whether or not the transmitter mail address matches a mail address stored in the storage unit 26 in Step S109 as a mail address of which rejection is to be cancelled.

In a case in which the mail transmitter matches a rejection cancellation address (in a case of "Yes" in S211), the mail transmitter matches a mail address from which the mail is to be rejected in the normal state, and is a mail address for which the rejection has been temporarily cancelled in Steps S101 through S111. Accordingly, the cellular phone 1 requests the provider to transmit this incoming mail detected in Step S201, and receives this mail (S205).

In a case in which the mail transmitter matches neither the permitted address nor the rejection cancellation address (in a case of "No" in S211), the main control unit 20 rejects reception of the incoming mail detected in Step S201 (S209). That is to say, for example, the main control 20 unit does not request the provider to transmit this mail, and removes the header received from the provider in Step S201, thereby rejecting the reception of this mail.

As described above, in a case in which there is an incoming mail, and the transmitter of this mail matches a mail address temporarily stored in the storage unit 26 after the cellular phone 1 has transmitted a mail to this mail address, mail reception is permitted until the number of times of mail reception reaches a predetermined number, even if the mail transmitter matches a mail address for which a mail reception permission has not been set.

With such an arrangement according to the first embodiment having the incoming mail rejection function, when a reply mail is to be received from a particular address for which a mail reception permission has not been set after a mail has been transmitted to this particular address, by temporarily storing this particular address, such an arrangement permits reception of a reply mail from this particular address without a need to disable the incoming mail rejection function.

Second Embodiment

Figure 8:
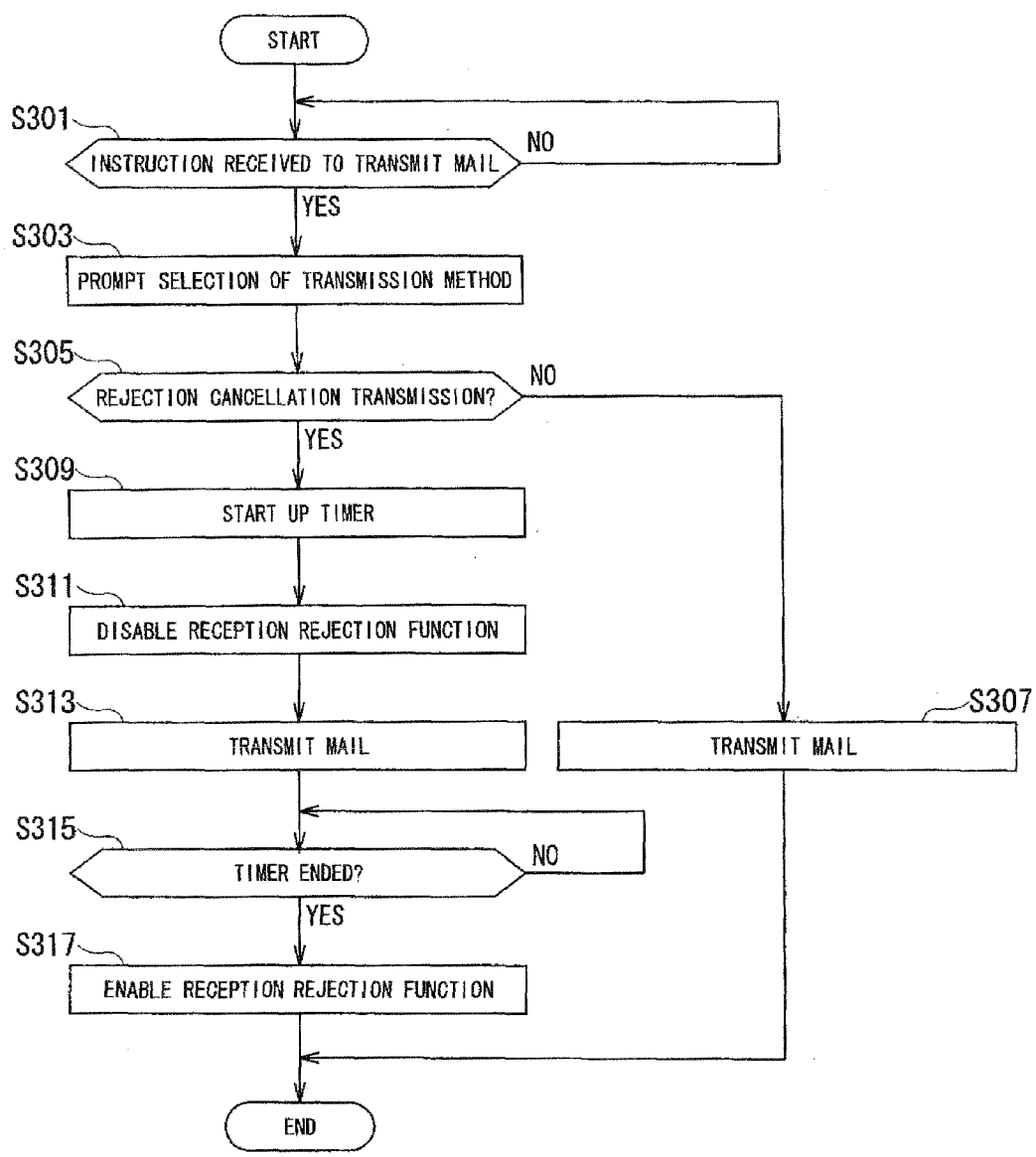
FIG. 8 is a flowchart which shows a procedure for transmitting a mail in the filter control processing at a cellular phone according to a second embodiment.
Figure 9:
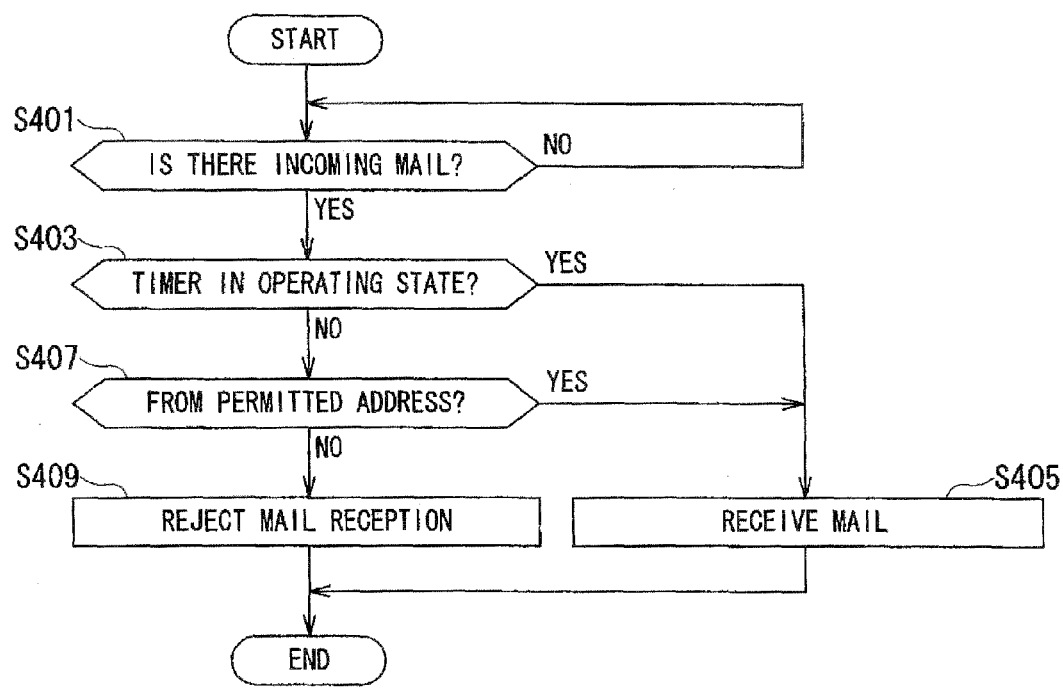
FIG. 9 is a flowchart which shows a procedure for receiving a mail in the filter control processing at the cellular phone according to the second embodiment.

Description will be made regarding a second embodiment of a communication apparatus according to the present invention with reference to FIGS. 8 and 9. The same components as those in the first embodiment are denoted by the same reference numerals, and redundant description thereof will be omitted. A communication apparatus (cellular phone 1) according to the second embodiment has the same configuration as that of the cellular phone 1 according to the first embodiment as shown in FIGS. 1 and 2. Also, the communication apparatus (cellular phone 1) according to the second embodiment has a configuration including a main control unit 20, a power supply circuit 21, an operation input control unit 22, a display control unit 23, an audio control unit 24, a communication control unit 25, a storage unit 26, a counter unit 27, and a timer unit 28, connected to one another via a bus so as to allow these components to mutually communicate with each other, as in the cellular phone 1 according to the first embodiment.

Description has been made in the first embodiment regarding an arrangement in which the cellular phone 1 has a filter control function in which the mail address of a destination to which the cellular phone 1 itself has transmitted a mail is stored, and mail reception from this particular mail address is permitted until the number of times of mail reception reaches a predetermined number even in a case in which the incoming mail rejection function is in the enabled state. The cellular phone 1 according to the second embodiment disables the incoming mail rejection function during a predetermined period of time after the cellular phone 1 itself has transmitted a mail to a particular mail address, thereby receiving a mail from such a particular mail address.

The cellular phone 1 according to the second embodiment performs filter control processing in which, after the cellular phone 1 has transmitted a blank mail to a particular address for which a mail reception permission has not been set, the cellular phone 1 permits reception of a mail from this particular address during only a period of time which satisfies predetermined conditions. Description will be made regarding a procedure for this filter control processing performed by the cellular phone 1 with reference to flowcharts shown in FIGS. 8 and 9 and the screen transition diagrams shown in FIGS. 5 and 6. Let us consider a case in which the incoming mall rejection function of the cellular phone 1 is in the enabled state.

First, description will be made with reference to the flowchart shown in FIG. 8 regarding a procedure for the processing for transmitting a mail to a particular address for which a mail reception permission has not been set. As in the first embodiment, description will be made regarding a case in which, when the user is browsing a Web page on the cellular phone 1, the user transmits a blank mail to a particular address according to a suggestion of a Web page which the user is browsing.

That is to says as shown in FIGS. 5A and 6A, for example, a message is displayed on a display screen 30 in order to suggest the user to transmit a blank mail when the user is browsing a Web page in this case, when the user gives an instruction to transmit a blank mail via the operation keys 15, for example, the cellular phone 1 displays a mail creation screen on the display screen 30, as shown in FIGS. 5B and 6B.

The mail creation screen includes a destination input field 31, a title input field 32, and a message body input field 33. The user inputs the destination for a mail, the title, and so forth, via the operation keys 15 according to the suggestion of the mail creation screen, and instructs the cellular phone 1 via the operation keys 15 to transmit the mail.

In this stage, the main control unit 20 judges whether or not the user gives an instruction to transmit a mail (S301). In this case, for example, in a case in which a predetermined operation key 15 has been pressed after the creation of the mail, the main control unit 20 judges that the user has given an instruction to transmit a mail. In a case in which the user has not given an instruction to transmit a mail (in a case of "No" in S301), the main control unit 20 enters the waiting state without any particular processing.

In a case in which the user has given an instruction to transmit a mail (in a case of "Yes" in S301), the main control unit 20 prompts the user to select a mail transmission method (S303). In this case, the main control unit 20 prompts the user to select the mail transmission method by displaying a transmission method selection field 34 on the display screen 30 as shown in FIGS. 5C and 6C, for example. Examples of the mail transmission methods include a "transmission" mode which indicates a normal transmission method, and a "rejection cancellation transmission" mode in which a mail is transmitted and the incoming rejection function is disabled for the mail address of the mail destination. The user specifies the transmission method for a mail by selecting the transmission method for the mail via the transmission method selection field 34, for example.

The main control unit 20 judges whether or not the "rejection cancellation transmission" mode has been selected as the transmission method (S305). In this step, for example, in a case in which the "rejection cancellation transmission" has been selected via the transmission method selection field 34, the main control unit 20 judges that the user has given an instruction to perform the rejection cancellation transmission. On the other hand, in a case in which the "transmission" has been selected via the transmission method selection field 34, for example, the main control unit 20 judges that the user has not given an instruction to perform the rejection cancellation transmission.

In a case in which the user has not given an instruction to instruct to perform the rejection cancellation transmission (in a case of "No" in S305), the main control unit 20 transmits a mail based upon the information input via the mail creation screen (S307) as in the normal state. In this step, it is preferable that a message is displayed on the display screen 30 to the effect that a mail is being transmitted, as shown in FIG. 5D.

In a case in which the user has given an instruction to perform the rejection cancellation transmission (in a case of "Yes" in S305), the main control unit 20 starts up a timer which counts a predetermined period of time (e.g., 10 minutes) (S309). In this step, the main control unit 20 transmits a signal to the timer unit 28 in order to start up a timer operation which counts the predetermined period of time. Upon reception of this signal, the timer unit 28 starts up the timer operation. After the elapse of the predetermined period of time, the timer unit 28 transmits a signal to the main control unit 20 to the effect that the timer operation has ended.

The main control unit 20 disables the incoming mail rejection function (S311). In this step, the main control unit 20 may disable the incoming mail rejection function for all the mail addresses. Also, the main control unit 20 may disable the incoming mail rejection function for only the mail addresses of mail destinations specified in Step S301. In a case in which the cellular phone 1 has disabled the incoming mail rejection function for all the mail addresses, during a period of time in which the incoming mail rejection function is to be disabled, the cellular phone 1 permits mail reception from both the mail addresses for which a reception permission has been set and the mail addresses for which a reception permission has not been set. On the other hand, in a case in which the cellular phone has disabled the incoming mail rejection function for only the destination mail addresses, the cellular phone 1 permits mail reception for the mail addresses for which a reception permission has been set and these destination mail addresses.

Then, the main control unit 20 transmits a mail based upon the information input via the mail creation screen (S313). In this step, it is preferable that a message is displayed on the display screen 30 to the effect that a mail is being transmitted, as shown in FIG. 5D.

The main control unit 20 judges whether or not the timer, which has been started up in Step S309, has ended (S315). In this step, upon reception of a signal from the timer unit 28 to the effect that the timer has ended, the control unit 20 judges that the timer has ended. In a case in which the timer has not ended (in a case of "No" in S315), the main control unit 20 is in the waiting state until the timer ends.

In a case in which the timer has ended (in a case of "Yes" in S315), the main control unit 20 again enables the incoming mail rejection function which has been disabled in Step S311 (S317). After the incoming mail rejection function has been enabled, the cellular phone 1 permits mail reception for only the mail addresses for which a reception permission has been set. Accordingly, the cellular phone 1 does not permit mail reception even in a case in which there is a reply mail transmitted from the destination to which the cellular phone 1 has transmitted a mail in Step S313.

As described above, when the cellular phone 1 transmits a mail to a mail address for which a mail reception permission has not been set, the cellular phone 1 starts up a timer used to disable the incoming mail rejection function before transmission of the mail.

Next, description will be made with reference to the flowchart shown in FIG. 9 regarding a procedure for processing in which the cellular phone 1 receives a mail from a particular mail address for which mail reception is not permitted in the normal state after the cellular phone 1 has transmitted a mail to this particular address in Steps S301 through S317.

First, the main control unit 20 judges whether or not there is an incoming mail to the cellular phone 1 (S401). When there is an incoming call to the cellular phone 1, the provider of the cellular phone transmits the header of this mail etc., to the cellular phone 1 in order to notify the cellular phone 1 that there is an incoming call to the cellular phone 1. The cellular phone 1, which has received the header etc., from the provider, judges based upon this header information whether this mail is to be received or rejected. When the cellular phone 1 is to receive the incoming mail, the cellular phone 1 requests the provider of the cellular phone to transmit the whole of the mail. Accordingly, in a case in which the cellular phone 1 has received the header of an incoming mail from the provider, for example, the cellular phone 1 judges that there is an incoming mail.

In a case in which there is no incoming mail (in a case of "No" in S401), the main control unit 20 enters the waiting state without any particular processing. In a case in which there is an incoming mail (in a case of "Yes" in S401), the main control unit 20 judges whether or not the timer is in the operating state (S403). In this step, in a case in which the judgment point in time is within a period of time from the point in time at which the timer has been started up in Step S309 up to the point in time at which the timer ends in Step S315, the main control unit 20 judges that the timer is in the operating state.

In a case in which the timer is in the operating state (in a case of "Yes" in S403), the incoming mail rejection function of the cellular phone 1 is in the disabled state. Accordingly, in a case in which there is an incoming call in Step S401 from a transmitter, the cellular phone 1 requests the provider to transmit an incoming mail detected in Step S401, regardless of whether or not the mail transmitter matches a mail address for which a reception permission has been set, thereby receiving this mail (S405). In this step, it is preferable that a message is displayed on the display screen 30 to the effect that a mail is being received, as shown in FIG. 6E. Furthermore, after the reception of the mail, the main control unit 20 displays the transmitter of the received mail, the title of the mail, and the message body of the mail, on the display screen 30 as shown in FIG. 6F.

In a case in which the timer is not in the operating state (in a case of "No" in S403), the incoming mail rejection function of the cellular phone 1 is in the enabled state. Accordingly, the main control unit 20 judges whether or not the transmitter of this mail matches a mail address (permitted address) for which a permission has been set (S407). In this step, for example, only in a case in which the mail address of the transmitter matches a mail address set as a permitted address in the address book stored in the storage unit 26, the main control unit 20 judges that the mail address of the transmitter matches a permitted mail address.

In a case in which the transmitter of the mail matches a permitted mail address (in a case of "Yes" in S407), the main control unit 20 requests the provider to transmit the incoming mail detected in Step S201, and receives this mail (S405).

In a case in which the mail transmitter matches a mail address for which a permission has not been set (in a case of "No" in S407), the main control unit 20 rejects reception of the incoming mail detected in Step S401 (S409). That is to say, for example, the main control 20 unit does not request the provider to transmit this mail, and removes the header received from the provider in Step S401, thereby rejecting the reception of this mail. In this case, as shown in FIG. 5E, the information with respect to this mail is not displayed on the display screen 30.

As described above, in a case in which there is an incoming mail, and the timer used to disable the incoming mail rejection function is in the operating state, the cellular phone 1 permits mail reception, even if the mail transmitter matches a mail address for which a mail reception permission has not been set.

It should be noted that an arrangement may be made in which the incoming mail rejection function is disabled in Step S311 without starting up the timer in Step S309, following which judgment is made whether or not the incoming mail is transmitted from the mail address of the destination instead of judgment in Step S403 whether or not the timer is in the operating state, and in a case in which the incoming mail matches the mail address of the destination, the mail is received in Step S405. With such an arrangement, without performing the processing items in Steps S315 and S317, after a mail has been received a predetermined number of times, the incoming mail rejection function is enabled again.

With such an arrangement according to the second embodiment having the incoming mail rejection function, when a reply mail is to be received from a particular address for which a mail reception permission has not been set after a mail has been transmitted to this particular address, by temporarily disabling the incoming mail rejection function, such an arrangement permits reception of a reply mail from this particular address without a need to disable the incoming mail rejection function.

Third Embodiment

Figure 10:
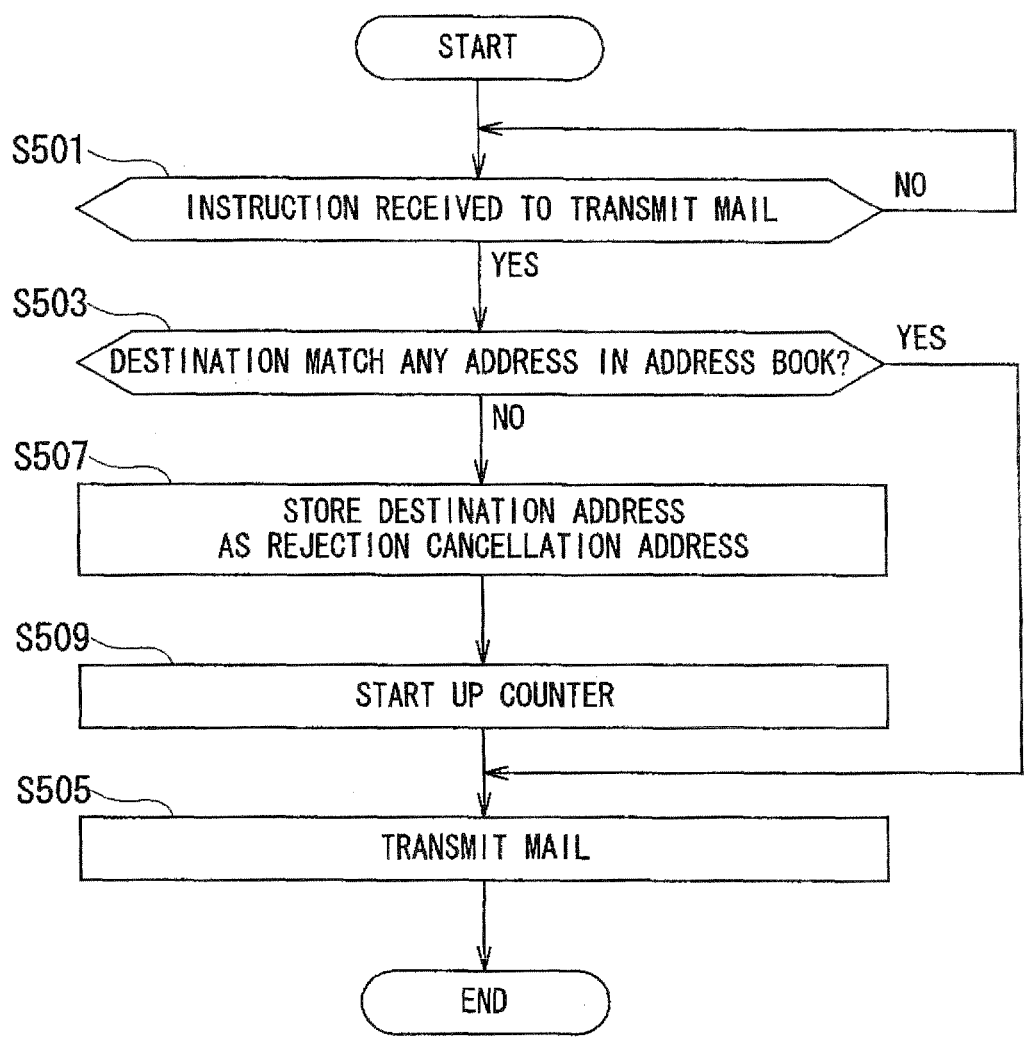
FIG. 10 is a flowchart which shows a procedure for transmitting a mail in the filter control processing at a cellular phone according to a third embodiment.
Figure 11:
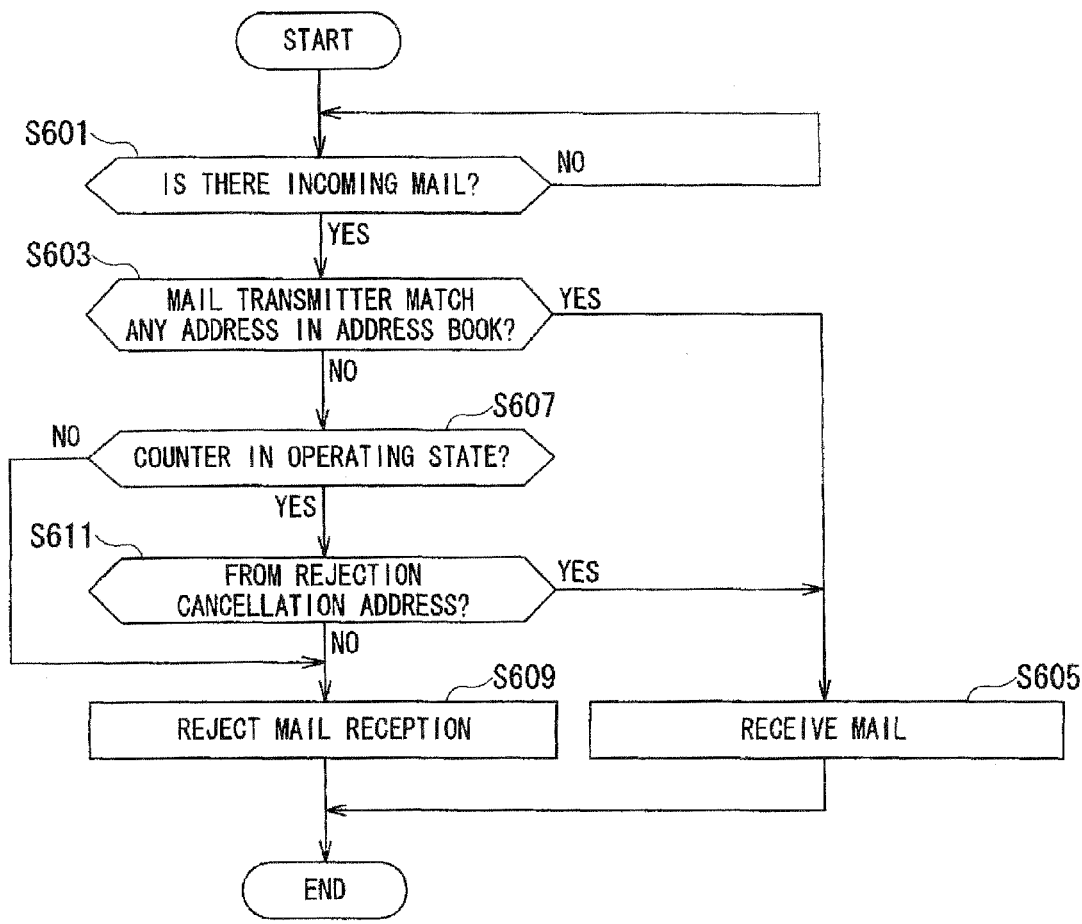
FIG. 11 is a flowchart which shows a procedure for receiving a mail in the filter control processing at the cellular phone according to the third embodiment.

Description will be made regarding a third embodiment of a communication apparatus according to the present invention with reference to FIGS. 10 and 11. The same components as those in the first embodiment are denoted by the same reference numerals, and redundant description thereof will be omitted. A communication apparatus (cellular phone 1) according to the third embodiment has the same configuration as those of the cellular phone 1 according to the first embodiment and the second embodiment as shown in FIGS. 1 and 2. Also, the communication apparatus (cellular phone 1) according to the third embodiment has a configuration including a main control unit 20, a power supply circuit 21, an operation input control unit 22, a display control unit 23, an audio control unit 24, a communication control unit 25, a storage unit 26, a counter unit 27, and a timer unit 28, connected to one another via a bus so as to allow these components to mutually communicate with each other, as in the cellular phone 1 according to the first embodiment and the second embodiment.

Description has been made in the first embodiment regarding an arrangement in which the cellular phone 1 has a filter control function in which, according to an instruction from the user, the mail address of a destination, to which the cellular phone 1 itself has transmitted a mail, is stored, and mail reception from this particular mail address is permitted even in a case in which the incoming mail rejection function is in the enabled state. With the third embodiment, in a case in which the destination, to which the cellular phone itself has transmitted a mail, has not be found in the address book stored in the storage unit 26, the cellular phone 1 stores the mail address of the destination to which the cellular phone itself has transmitted the mail, and permits mail reception from this mail address, regardless of the user's instruction.

The cellular phone 1 according to the third embodiment performs filter control processing in which, after the cellular phone 1 has transmitted a blank mail to a particular address for which a mail reception permission has not been set, the cellular phone 1 permits reception of a mail from this particular address during only a period of time which satisfies predetermined conditions. Description will be made regarding a procedure for this filter control processing performed by the cellular phone 1 with reference to flowcharts shown in FIGS. 10 and 11 and the screen transition diagrams shown in FIGS. 5 and 6. Let us consider a case in which the incoming mail rejection function of the cellular phone 1 is in the enabled state.

First, description will be made with reference to the flowchart shown in FIG. 10 regarding a procedure for the processing for transmitting a mail to a particular address for which a mail reception permission has not been set. As in the first embodiment and the second embodiment, description will be made regarding a case in which, when the user is browsing a Web page on the cellular phone 1, the user transmits a blank mail to a particular address according to a suggestion of a Web page which the user is browsing.

That is to say, as shown in FIGS. 5A and 6A, for example, a message is displayed on a display screen 30 in order to suggest the user to transmit a blank mail when the user is browsing a Web page. In this case, when the user gives an instruction to transmit a blank mail via the operation keys 15, for example, the cellular phone 1 displays a mail creation screen on the display screen 30, as shown in FIGS. 5B and 6B.

The mail creation screen includes a destination input field 31, a title input field 32, and a message body input field 33. The user inputs the destination for a mail, the title, and so forth, via the operation keys 15 according to the suggestion of the mail creation screen, and instructs the cellular phone 1 via the operation keys 15 to transmit the mail.

In this stage, the main control unit 20 judges whether or not the user gives an instruction to transmit a mail (S501). In this case, for example, in a case in which a predetermined operation key 15 has been pressed after the creation of the mail, the main control unit 20 judges that the user has given an instruction to transmit a mail. In a case in which the user has not given an instruction to transmit a mail (in a case of "No" in S501), the main control unit 20 enters the waiting state without any particular processing.

In a case in which the user has given an instruction to transmit a mail (in a case of "Yes" in S501), the main control unit 20 judges whether or not the mail destination is found in the address book stored in the storage unit 26 (S503). In a case in which the mail destination has been found in the address book (in a case of "Yes" in S503), the main control unit 20 transmits a mail based upon the information input via the mail creation screen in the same way as in the normal state (S505). In this step, it is preferable that a message is displayed on the display screen 30 to the effect that a mail is being transmitted, as shown in FIG. 5D.

In a case in which the mail destination has not been found in the address book (in a case of "No" in S503), the main control unit 20 stores the mail address of this destination as the rejection cancellation address in the storage unit 26 (S507). Furthermore, the main control unit 20 starts up a counter in order to count the number of times of mail reception from the mail address of this destination (S509). In this step, the main control unit 20 starts up the counter by specifying a predetermined number (e.g., 1), and by transmitting an instruction to the counter unit 27 to count the number of times of mail reception from a predetermined communication party (mail destination) until the number of times of mail reception reaches this predetermined number.

Then, the main control unit 20 transmits a mail based upon the information input via the mail creation screen (S505). In this step, it is preferable that a message is displayed on the display screen 30 to the effect that a mail is being transmitted, as shown in FIG. 6D.

As described above, when the cellular phone 1 transmits a mail to a mail address for which a mail reception permission has not been set, in a case in which the mail address of the destination does not match any mail address stored in the address book, the cellular phone 1 temporarily stores the mail address of this destination in the storage unit 26, and starts up a counter for counting the number of times of mail reception from this mail address, following which the cellular phone 1 transmits a mail.

Next, description will be made with reference to the flowchart shown in FIG. 11 regarding a procedure for processing in which the cellular phone 1 receives a mail from a particular mail address for which mail reception is not permitted in the normal state after the cellular phone 1 has transmitted a mail to this particular address in Steps S501 through S509.

First, the main control unit 20 judges whether or not there is an incoming mail to the cellular phone 1 (S601). When there is an incoming call to the cellular phone 1, the provider of the cellular phone transmits the header of this mail etc., to the cellular phone 1 in order to notify the cellular phone 1 that there is an incoming call to the cellular phone 1. The cellular phone 1, which has received the header etch, from the provider, judges based upon this header information whether this mail is to be received or rejected. When the cellular phone 1 is to receive the incoming mail, the cellular phone 1 requests the provider of the cellular phone to transmit the whole of the mail. Accordingly, in a case in which the cellular phone 1 has received the header of an incoming mail from the provider, for example, the cellular phone 1 judges that there is an incoming mail.

In a case in which there is no incoming mail (in a case of "No" in S601), the main control unit 20 enters the waiting state without any particular processing. In a case in which there is an incoming mail (in a case of "Yes" in S601), the main control unit 20 judges whether or not the mail transmitter matches a mail address registered in the address book stored in the storage unit 26 (S603).

In a case in which the mail transmitter matches a mail address in the address book (in a case in "Yes" in S603), the mail transmitter, from which the incoming mail has been detected in S401, matches a mail address for which a reception permission has been set. Accordingly, the main control unit 20 requests the provider to transmit the incoming mail detected in Step S601, and receives this mail (S605). In this step, it is preferable that a message is displayed on the display screen 30 to the effect that a mail is being received, as shown in FIG. 6. After the reception of the mail, the main control unit 20 displays the transmitter of the received mail, the title of the mail, and the message body of the mail, on the display screen 30 as shown in FIG. 6F.

In a case in which the mail transmitter does not match any address in the address book (in a case of "No" in S603), judgment is made whether or not the counter is in the operating state (S607). In this step, in a case in which the counter has been started up in Step S509, the main control unit 20 judges that the counter is in the operating state.

In a case in which the counter is not in the operating state (in a case of "No" in S607), the main control unit 20 rejects reception of the incoming mail detected in Step S601 (S609). That is to say, for example, the main control 20 unit does not request the provider to transmit this mail, and removes the header received from the provider in Step S601, thereby rejecting the reception of this mail. In this case, as shown in FIG. 5E, the information with respect to this mail is not displayed on the display screen 30.

In a case in which the counter is in the operating state (in a case of "Yes" in S607), the main control unit 20 judges whether or not the transmitter of the mail matches a rejection cancellation address (S611). That is to say, the main control unit 20 judges whether or not the mail address of the transmitter matches a mail address stored as the rejection cancellation address in the storage unit 26 in Step S507.

In a case in which the transmitter of the mail matches a rejection cancellation address (in a case of "Yes" in S611), the main control unit 20 requests the provider to transmit the incoming mail detected in Step S601, and receives this mail (S605). In a case in which the transmitter of the mail does not match a rejection cancellation address (in a case of "No" in S611), the main control unit 20 rejects reception of the incoming mail detected in Step S601.

As described above, in a case in which there is an incoming mail, and the transmitter of this mail matches a mail address temporarily stored in the storage unit 26 after the cellular phone 1 has transmitted a mail to this mail address, mail reception is permitted until the number of times of mail reception reaches a predetermined number, even if the mail transmitter matches a mail address for which a mail reception permission has not been set.

With such an arrangement according to the third embodiment having the incoming mail rejection function, when a reply mail is to be received from a particular address for which a mail reception permission has not been set after a mail has been transmitted to this particular address, by temporarily storing this particular address, such an arrangement permits reception of a reply mail from this particular address without a need to disable the incoming mail rejection function.

It should be noted that the present invention is not restricted to such an arrangement in which, in Step S211 or Step S611, only in a case of detecting perfect matching between the mail address of the mail transmitter and the rejection cancellation address stored in the storage unit 26, judgment is made that the mail transmitter matches a rejection cancellation address. An arrangement may also be made in which, in a case of detecting domain matching therebetween, judgment is made that mail transmitter matches a rejection cancellation address.

Description has been made in the first embodiment through the third embodiment regarding the filter control processing in the mail transmission/reception operation. Also, the same processing can be applied to the voice communication operation. With such an arrangement, the mail address is replaced by the phone number. In a case in which there is an incoming call from a phone number for which a permission has not been set after the user calls this phone number, the incoming call rejection filter control operation is performed for the voice communication operation.

Description has been made in the first embodiment and the third embodiment regarding an arrangement in which the counter is started up. Also, description has been made in the second embodiment regarding an arrangement in which the timer is started up. However, the present invention is not restricted to such arrangements. Also, the timer may be started up in the first embodiment or the third embodiment. Also, the counter may be started up in the second embodiment.

Description has been made in the first embodiment through the third embodiment regarding an arrangement in which the cellular phone 1 performs the filter control processing. However, the present invention is not restricted to such an arrangement. Also, the filter control processing may be performed at a mail server operated by the provider. With such an arrangement, the cellular phone 1 transmits permitted addresses to the mail server beforehand, and in a case in which the cellular phone 1 has transmitted a mail to a mail address that differs from the permitted addresses, the mail server performs the processing items in Steps S105 through S107, Steps S201 through S209, Steps S305 through S317, or Steps S401 through S409

In a case in which there is an incoming mail to the cellular phone 1 using the SMS (Short Message Service), the cellular phone provider transmits the whole of the mail without transmitting the header or the like of the mail. Accordingly, in a case in which the cellular phone 1 has received a mail using the SMS, in Step S209, S409, or S609, this incoming mail should be removed without notifying the user of this incoming mail.

Description has been made regarding the cellular phone 1 according to the present invention. However, the present invention is not restricted to such an arrangement. Also, the present invention can be applied to any desired communication apparatus as long as it has a voice communication function or a mail transmission/reception function, examples of which include PHSs (Personal Handyphone Systems), PDAs (Personal Digital Assistants), mobile music players, mobile video cameras, mobile game machines, etc.

What is claimed is:

1. A communication apparatus having a filter function of rejecting mail reception from an address that differs from a permitted address specified beforehand, comprising:
    a first transmission unit configured to transmit a mail to a predetermined mail address that differs from the permitted address;
    a first storage unit configured to store the mail address of a destination to which a mail is transmitted by the first transmission unit;
    a judging unit configured such that, when there is an incoming mail from a mail address that differs from the permitted address, the judging unit judges whether or not the mail address of the transmitter of this incoming mail matches a mail address stored in the first storage unit; and
    a receiving unit configured such that, in a case in which the judging unit has judged that the mail address of the incoming mail matches that stored in the first storage unit, the receiving unit receives this incoming mail.

2. A communication apparatus according to claim 1, wherein the receiving unit receives an incoming mail from a mail address stored in the first storage unit a predetermined number of times.

3. A communication apparatus according to claim 1, including an input receiving unit configured to receive an input of whether or not the filter function is to be disabled when a mail is transmitted to a predetermined mail address that differs from the permitted address,
    wherein, in a case in which the input receiving unit has received an input to the effect that the filter function is to be disabled, the first storage unit stores the mail address of the destination to which a mail has been transmitted from the transmission unit.

4. A communication apparatus according to claim 1, including a second storage unit configured to store the permitted address,
    wherein, in a case in which the mail address of the destination, to which the first transmission unit transmitted to a mail, does not match any mail address stored in the second storage unit, the first storage unit stores this mail address.

5. A communication apparatus according to claim 1, including a second transmission unit configured to transmit the mail address to which the first transmission unit transmitted a mail to a mail server as a rejection cancellation address,
    wherein the receiving unit receives a mail when the mail is transmitted from the rejection cancellation address via the mail server.

6. A communication apparatus according to claim 1, including a removing unit configured such that, in a case in which the judging unit judged that the mail address of the incoming mail does not match that stored in the first the storage unit, the removing unit removes this incoming mail.

* * * * *